(No Model.)
J. F. TRACEY.
PIPE COVERING.
No. 438,507. Patented Oct. 14, 1890.
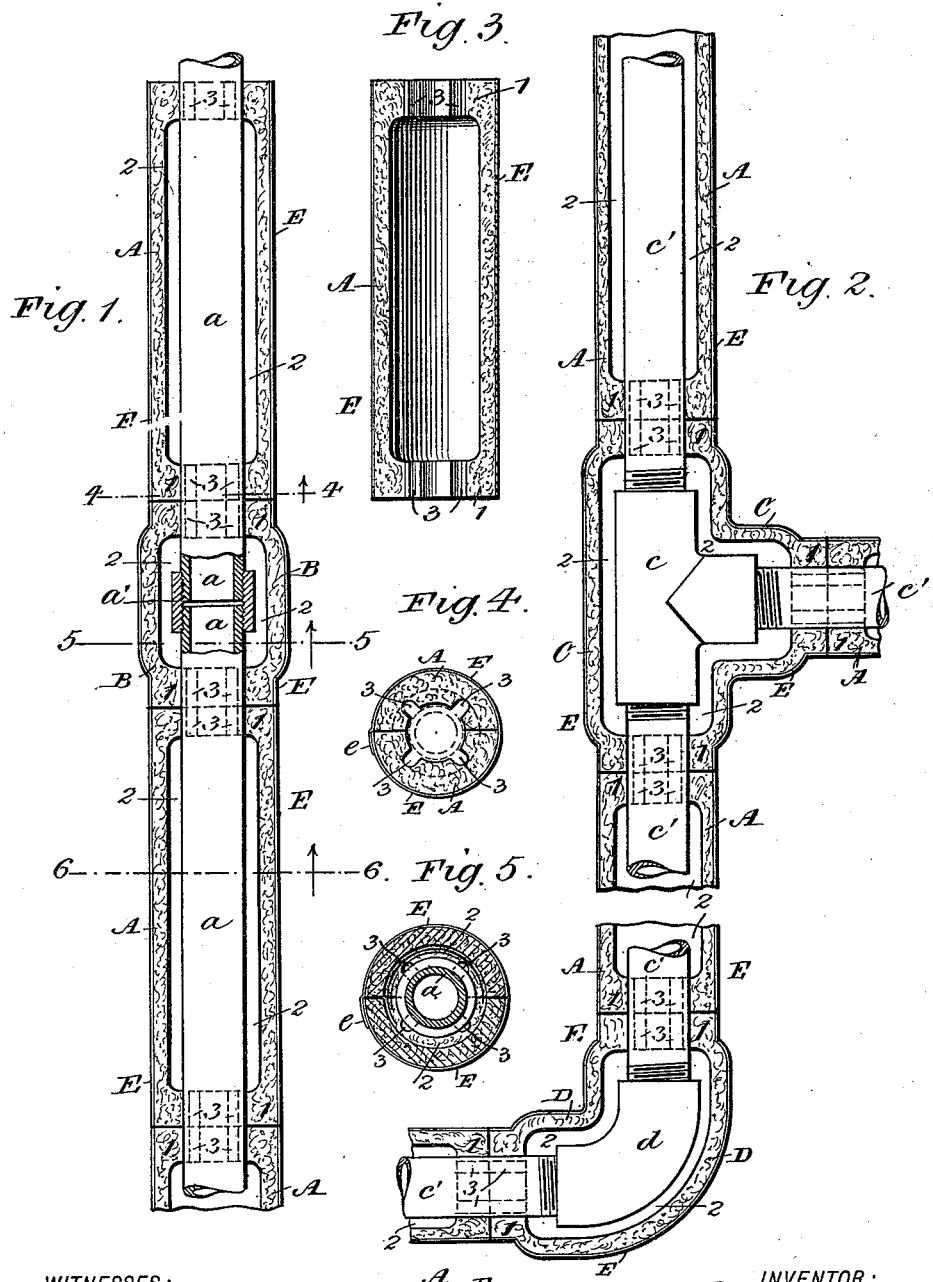
WITNESSES:
Paul Johot
C. Sedgwick
INVENTOR:
J. F. Tracey
BY Munn & Co.
ATTORNEYS.

UNITED STATES PATENT OFFICE.

JOHN F. TRACEY, OF NEW YORK, N. Y.

PIPE-COVERING.

SPECIFICATION forming part of Letters Patent No. 438,507, dated October 14, 1890.

Application filed April 16, 1890. Serial No. 348,253. (No model.)

*To all whom it may concern:*

Be it known that I, JOHN FRANCIS TRACEY, of the city, county, and State of New York, have invented a new and Improved Pipe-Covering, of which the following is a full, clear, and exact description.

My invention relates to coverings adapted to prevent condensation in or radiation from pipe lines or connections, and has for its object to provide simple, inexpensive, and efficient coverings of this character.

The invention will first be described, and then will be particularly pointed out in the claims.

Reference is to be had to the accompanying drawings, forming a part of this specification, in which similar figures and letters of reference indicate corresponding parts in all the views.

Figure 1 is a longitudinal sectional view of the end portions of two pipes coupled in alignment and protected by my improved covering. Fig. 2 is a longitudinal sectional view illustrating the application of the coverings to T and elbow-pipe fittings. Fig. 3 is an inside face view of one semi-cylindrical portion or length of pipe-covering made in accordance with my invention. Fig. 4 is a transverse section of a complete pipe-covering as it would appear when taken on the line 4 4 in Fig. 1, and Figs. 5 and 6 are like cross-sectional views taken on the lines 5 5 and 6 6, respectively, in Fig. 1.

I prefer to make my improved pipe-coverings of pure asbestus and in half-sections, adapted, when placed together around a straight pipe or a T or elbow-pipe fitting, to inclose or cover the pipe or fitting and prevent condensation of steam therein and also prevent radiation of heat from the pipe and fittings.

For covering straight lines of pipe coupled by ordinary screw couplings or nipples, I will use two half-sections A A on the straight or unjointed parts of the pipe-line, and two slightly concavo-convex covering-sections B B next the screw-coupling, while for a T-fitting I employ two correspondingly-shaped half-sections C, and for an elbow-fitting I use two correspondingly-shaped half-sections D of the covering. However the pipe-covering sections may be shaped to correspond with the pipes or fittings they inclose and protect, the same principles of construction prevail throughout—that is to say, the main body portions of the covering-sections are hollowed out between their end parts 1 1 to provide an air space or chamber 2 between the pipe or fitting and the asbestus or other material of the covering, while the end portions 1 1 fit against the pipe to center and steady the coverings around the pipe or fitting. These end parts 1 of the coverings are provided with longitudinally-ranging interior grooves or channels 3, preferably two grooves in the end parts 1 of each half-section of the covering, and as most clearly seen in Figs. 3, 4, 5, and 6 of the drawings.

The end parts 1 of the covering-sections may be but three or four inches in length, while the body portions of the sections may have any length desired. I propose making the sections A for straight lines of pipes about three feet long. The covering-sections B are bulged out or concaved at the center, to provide the air-space 2 clear around the screw-coupling $a'$, which connects the two lengths of pipe $a\,a$, and this joint-section of the covering needs be only long enough to provide the air-space around the coupling, and the two end parts 1 1 to steady the section on the pipes. (See Fig. 1 of the drawings.)

The two half-sections C of the pipe-covering which inclose the T-fitting $c$, to which main and branch lines $c'\,c'$ of pipes are connected, are shaped to provide the interior air-space 2 and also the ends 1 1 1, which bear on the pipes $c'$ and center the complete covering around the T-fitting, and these ends 1 have the interior grooves or channels 3, which communicate with like grooves of abutting sections of the main and branch pipe coverings. The covering-sections D, which surround the elbow-pipe fitting $d$, also provide the air-space around said fitting, and the ends 1 of these sections which fit the main line $c'$ of pipes are provided with air channels or grooves 3, which communicate with like grooves of the abutting sections A of the pipe-covering.

It will be noticed that the pipe-covering sections provide an independent air chamber or space 2 all around the main body of the pipe or fitting which they inclose, and that the coinciding grooves 3 3 in the abutting ends 1 of the sections make this air-space practically continuous for the entire length of a line of pipes, which may include any required number of T, elbow, or other irregularly-formed fittings used in connecting the main and branch pipes. I consider the coinciding grooves 3 3 in the abutting ends of the pipe-covering sections an important feature of my invention, because the continuous air-space they assure along the entire line of pipes and their fittings tends to equalize the temperature of the pipes and makes the coverings more effective in preventing radiation of heat from the pipes.

I prefer to inclose the coverings A B C D within outer casings E, made of canvas or other suitable fabric and glued or otherwise fastened to the opposing covering-sections and lapped on one of them at $e$, as clearly shown in the drawings. While I prefer to make the pipe-coverings of pure asbestus, I may use hair, wool, or any other suitable material capable of being molded or formed into requisite shapes and of retaining their form after being applied to the pipes. It will be understood, however, that any suitable material or materials which are non-conductors of heat may be used in combination with asbestus fibers, which would form the main bulk of the substances employed in making the coverings.

I am aware that pipe-coverings have before been made in complete cylindrical sections provided with interior lugs which center them on the pipe they cover and protect, and I have also seen pipe-coverings made in longitudinally-divided sections placed outside of a sheet-metal jacket or cylinder which surrounds but does not touch a steam-pipe and provides an air-space next it. I am also aware of a pipe-covering made with two longitudinally-joined two-part sheet-metal cylinders, one longer than the other and the smaller one larger than the pipe covered to provide an air-space next it, and having cotton-seed hulls packed between the two cylinders. I am also aware that practically pure asbestus fiber has before been made into cylinders split or slit open along one side to allow them to be opened and slipped over a pipe which they fit closely. My improvement is readily distinguishable from all these coverings in that it is made in longitudinally-divided sections, each having integral end parts adapted to fit or bear on a pipe and provided with an intermediate recess or hollow body portion, assuring an air-space next the pipe. The integral end parts which fit the pipe are preferably provided with grooves or passages making the air-space continuous along a line of pipes. The coverings for collar-joints of aligned pipes and for T or elbow pipe fittings are also made in separable sections each provided with a hollow inner body portion and with end parts fitting the pipes, and preferably provided with grooves or passages making a continuous air-space next the pipes and fittings.

It is obvious that my improved pipe-coverings may be easily applied and removed and reapplied without damage and that they are adapted to fit any line of pipes of any size, either straight or branched, and that the coverings may be applied by unskilled labor with great economy of time over other systems of pipe-coverings now in use.

Having thus described my invention, what I claim as new, and desire to secure by Letters Patent, is—

1. Pipe-coverings made in longitudinally-divided sections, each having integral end parts adapted to fit a pipe and provided with an intermediate recessed or hollow body portion assuring an air-space next the pipe, said end parts of the coverings having grooves or passages making the air-space continuous along a line of pipes, substantially as described.

2. Pipe-coverings made wholly or mainly of asbestus and in longitudinally-divided sections, each having integral end parts adapted to fit a pipe and provided with an intermediate recessed or hollow body portion assuring an air-space next the pipe, said end parts of the coverings having grooves or passages making the air-space continuous along a line of pipes, substantially as described.

3. In pipe-coverings, the T-fitting covering C, made in separable sections, each having three end parts 1 1 1, adapted to the pipes joined by the fitting and provided with an interior recess forming an air-space 2 around the fitting, said end parts 1 having grooves 3, making the air-space continuous along joined main and branch pipes, substantially as described.

4. In pipe-coverings, the elbow-fitting covering D, made in separable sections, each having end parts 1 1, adapted to the pipes joined by the fitting and provided with an interior recess forming an air-space 2 around the fitting, said end parts 1 having grooves 3, making the air-space continuous along the joined pipes, substantially as described.

JOHN F. TRACEY.

Witnesses:
HENRY L. GOODWIN,
C. SEDGWICK.